United States Patent [19]

Migrin et al.

[11] Patent Number: 4,613,733
[45] Date of Patent: Sep. 23, 1986

[54] DELAY WIPER SWITCH

[75] Inventors: Robert S. Migrin; David V. Tinder, both of Dearborn, Mich.

[73] Assignee: United Technologies Automotive, Inc., Dearborn, Mich.

[21] Appl. No.: 656,841

[22] Filed: Oct. 2, 1984

[51] Int. Cl.[4] .............................................. H01H 9/00
[52] U.S. Cl. .................................. 200/5 R; 15/250.12; 338/191
[58] Field of Search ................ 200/5 R, 61.27, 61.54, 200/110 A, 61.85, 157, 292, 4; 318/DIG. 2; 338/92, 162, 190, 191, 192, 194, 308, 309; 15/250.12

[56] References Cited

U.S. PATENT DOCUMENTS 3,312,925  4/1967  Frantz .............................. 200/4 X

FOREIGN PATENT DOCUMENTS

2053572A  2/1981  United Kingdom ............ 200/61.27

Primary Examiner—A. D. Pellinen
Assistant Examiner—Morris Ginsburg
Attorney, Agent, or Firm—Stephen A. Schneeberger

[57] ABSTRACT

A switch for controlling wiper delay includes a housing, a circuit board having a contact pattern of several parts on a surface thereof positioned in the housing, some of the contact pattern parts being arranged in a closely-spaced, radially-extending array, a carriage rotatable in the housing, electrical contacts mounted on the carriage and disposed for engagement with selected parts of the contact pattern as a function of the position of the carriage, a discrete resistive element having at least three conductive leads extending therefrom and subdividing the resistive element into a resistor network having a plurality of resistive values, each conductive lead of the resistive element being conductively affixed to a respective one of the contact pattern parts in the array, and wherein the carriage is manually actuatable to place the electrical contact into contact with successive ones of the contact pattern parts in the array to vary the interval between sweeps of a wiper. An additional electrical contact resiliently supported by a conductive beam spring has one end mounted in fixed conductive engagement with one of the contact pattern parts of the circuit board. The beam spring is biased into engagement with a cam surface on the periphery of the carriage for selective electrical connection of that additional contact with another of the circuit contact pattern parts as a function of carriage position to control high speed operation of a wiper motor.

10 Claims, 14 Drawing Figures

DELAY WIPER SWITCH

TECHNICAL FIELD

The present invention relates to an electrical switch and more particularly to a switch for controlling wiper operation, as in an automobile. More particularly still, the invention relates to a switch for controlling delayed wiper operation.

BACKGROUND ART

Variable resistances or rheostats are often used in combination with electrical switches, as illustrated in U.S. Pat. No. 4,085,399 in which a resistive element disposed on a circuit board is contacted by a movable wiper. The resistive elements have taken many forms, however a resistive film deposited on the circuit board is often used. An example of such a deposited resistance is disclosed in U.S. Pat. No. 3,921,118 in which the contour of the deposited resistance is shaped to effect a desired resistive function.

The inclusion of a rheostat in a switch intended for automotive application is disclosed in U.S. Pat. No. 3,121,854. There, a switch having an actuator operative in two different modes mechanically effects control of a rheostat through a gearing arrangement associated with the actuator in one mode of control.

More specifically, switches exist for the combined control of a windshield washer and wiper timing, and such switches include provision for adjusting wiper speed through use of a resistance incorporated as part of the switch. Examples of such switches include U.S. Pat. Nos. 2,993,098 and 3,750,080. The U.S. Pat. No. 2,993,098 includes a single discrete resistor mounted on the switch housing and having a single end lead which is fed through for engagement with a movable contact within the switch housing. Such arrangement provides a single intermediate speed.

U.S. Pat. No. 3,750,080 illustrates a switch in which a single actuator element provides two modes of control, one of which includes the provision of a continuous resistive track disposed on a substrate or mounting surface.

In those situations requiring a switch for timed or delay operation of a wiper switch in an automobile, it is now generally desirable to be able to provide at least several wiper sweep delay intervals. Moreover, it is preferable that the switch have substantially repeatable characteristics and that the variable resistance mechanism be free of inconsistencies or unwanted discontinuities. Unfortunately, the direct deposition of a resistive film on the surface of a circuit board does not readily lend itself to an accurate patterning of the film and/or to trimming of the film once deposited. This is particularly true where the desired resistive sequence may be non-linear in character. Further the deposition of a resistive film or films directly on the circuit board may be troublesome in applications in which the available area for contact wiper scanning on a circuit board must be held to a minimum for compactness of the overall circuit assembly.

DISCLOSURE OF INVENTION

Accordingly, it is an object of the invention to provide an improved switch for controlling wiper delay. Included within this object is the provision of a switch which utilizes a circuit board. It is a further object of the invention to provide such switch in a relatively compact configuration. Further still, it is an object of the invention to provide in the switch a range of delay intervals in a manner which is accurate and repeatable.

According to the invention, a switch is provided for controlling wiper delay and includes a housing, a circuit board in the housing and having a contact pattern of several parts disposed on a surface thereof, some of the contact pattern parts being arranged in an array, a carriage movable in the housing, electrical contacts mounted on the carriage and disposed for engagement with selected parts of the contact pattern as a function of the position of the carriage, a discrete resistive element having at least three conductive leads extending therefrom and subdividing the resistive element into a resistor network having a plurality of resistive values, each conductive lead of the resistive element being conductively affixed to a respective one of the contact pattern parts in the array, and wherein the carriage is manually actuatable to place the electrical contact into contact with successive ones of the contact pattern parts in the array to vary the interval between sweeps of a wiper. In the illustrated embodiment, the carriage is mounted for rotation about an axis and the contact pattern parts in the array are sequentially spaced along an arcuate path defined by the electrical contact during rotation of the carriage. The contact pattern parts in the array are narrow, closely spaced and generally radially-extending. The resistive element is preferably a film resistor manufactured apart from the present circuit board and having a plurality of discrete leads, as for instance eight, which provide connection with a plurality of resistive values. The resistor may be mounted to the underside of the circuit board and the leads thereof fed-through for conductive engagement with the contact pattern parts of the array at convenient locations therealong.

The carriage further includes a cam surface on a peripheral surface thereof and includes an additional electrical contact which is resiliently supported by a conductive beam spring having one end mounted in fixed conductive engagement with one of the contact pattern parts of the circuit board. The beam spring is biased into engagement with the carriage cam surface for selective electrical connection of that additional contact with another of the circuit contact pattern parts as a function of the carriage position. The contact mounted on the beam spring controls high speed operation of a wiper motor and is connected with the circuit board contact pattern parts near a terminal edge of the circuit board to minimize the resistance of the intermediate conductive path.

The carriage is rotatable in one direction from an "off" position to place the carriage contact in engagement with successive ones of the contact pattern parts in the array for variable interval operation. The carriage is also rotatable in an opposite direction from the "off" position to effect single-speed operation of the wiper. A torsion spring affixed to the carriage includes a cantilevered arm which engages a stop in the switch when rotated from the "off" position toward the single-speed position to resiliently bias the carriage toward the "off" position for return when released. The switch assembly may additionally include a second carriage mounted for manually-actuated linear displacement from a first position to a second position. The second carriage also includes electrical contacts associated with certain contact pattern parts of the circuit board and serves to control washer motor actuation.

BRIEF DESCRIPTION OF THE DRAWINGS

FIGS. 4A-4D are plan views of the switch of FIG. 1 with the cover removed and showing the respective washer and wiper switches in differing positions with FIG. 4A showing both switches in an "off" position;

FIG. 4B illustrates, in phantom, the washer switch in its actuated position and the wiper switch thereby actuated in its "low" speed position;

FIGS. 7A-7E are plan views of the switch of FIG. 5, with the cover removed, showing the washer and wiper switches in various operating positions and wherein FIG. 7A illustrates the switches in their "off" position;

BEST MODE FOR CARRYING OUT THE INVENTION

Figure 1:
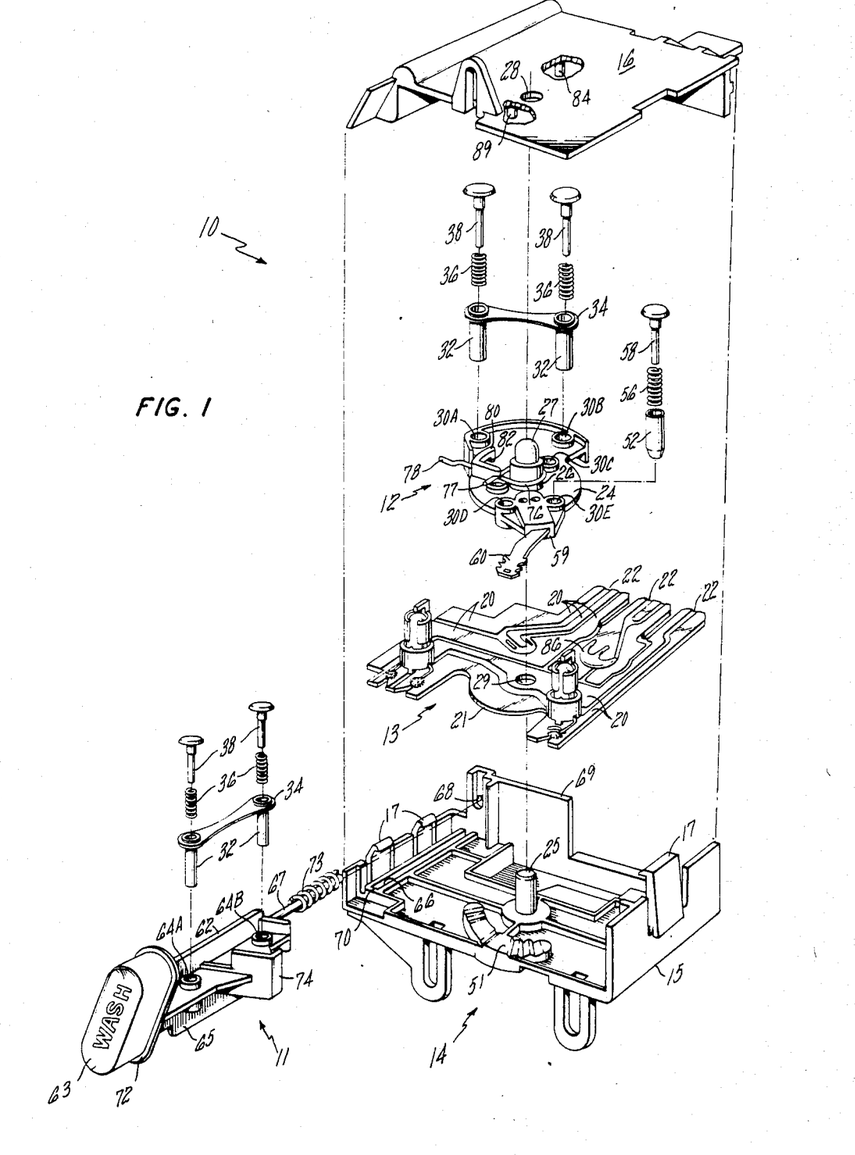
FIG. 1 is an exploded view of a washer/wiper switch.

Referring to FIG. 1 there is illustrated in exploded form, a washer/wiper switch assembly 10. The switch assembly 10 includes a washer switch carriage assembly 11 and a wiper switch carriage assembly 12 each mounted for displacement relative to a circuit board assembly 13 and collectively positioned and mounted within a housing 14 comprised of a base portion 15 and a cover portion 16. For the purposes of the following description, the washer/wiper switch 10 will be presumed to have a particular spatial orientation in which the base portion 15 is lowermost, the cover 16 is uppermost and manual activation occurs at a forward end, however it will be appreciated that such orientation is only to facilitate description of the interrelationship of the component parts and other spatial attitudes are possible.

The housing 14 is preferably formed of molded plastic, with the base portion 15 serving as the principal mounting surface for the circuit board assembly 13, the washer switch carriage assembly 11, and the wiper switch carriage assembly 12. The housing base portion 15 is designed to cooperatively engage with cover 16, as by snap locks 17 to provide the housing closure 14 for the switch elements. The housing 14 is of relatively rigid construction so as to provide a substantially-rigid geometrical configuration, for reasons to be appreciated more fully hereinafter.

The circuit board assembly 13 comprises a selected pattern of conductive contact surfaces, generally designated 20 and disposed, as by printing or etching or other suitable manner, on a substantially rigid substrate 21, as for instance a glass-epoxy material. The various separate parts 20 of the conductive contact pattern lead to one or more terminal tabs 22 formed at the rear edge of the circuit board for connection in a known manner via an electrical connector (not shown) with a respective washer pump motor, (not shown) and a two-speed wiper motor (not shown). The switching action of switch 10 is provided by displacement of one or both of the washer switch assembly 11 and the wiper switch assembly 12 to respective selected positions by which selected conductive pattern parts 20 are electrically connected to one another by an electrical contact arrangement carried by and forming part of the respective washer switch carriage assembly 11 or wiper switch carriage assembly 12.

Referring to the wiper switch carriage assembly 12, a molded plastic rotor 24 is adapted to rotate about a vertical axis defined by pintle 25 extending upwardly from and formed integrally with the housing base portion 15. The rotor 24 includes an axially-extending cylindrical hub 26 extending both upwardly and downwardly from the rotor for rotatingly encircling the pintle 25. The upper portion of rotor hub 26 is closed and domed to provide a secondary pintle 27 for rotatable insertion through an opening 28 in the cover 16. The circuit board assembly 13 is supported in direct engagement with the housing base portion 15, with pintle 25 extending upwardly through an opening 29 in the circuit board assembly. The hub 26 of rotor 24 is rotatably disposed on pintle 25, and the axial extent of hub 26 below rotor 24 is such that the lower end-face of that hub is in sliding bearing engagement with an upper surface of the circuit board assembly 13. The rotor 24 includes five circular openings 30A, 30B, 30C, 30D and 30E, respectively, extending axially therethrough at various locations radially spaced from the hub 26. All of the openings 30A-E are of the same diameter, with openings 30A-C being positioned generally rearwardly of hub 26 and openings 30D and 30E being positioned generally forwardly of the hub in the various operating orientations of rotor 24. In the illustrated embodiment, much of the body of rotor 24 is relatively thin axially, however, the openings 30A-E are each positioned in portions of the hub having a significant axial extent, i.e., about 0.35 inch.

Two of the three rearward openings 30A-C in rotor 24 serve to house a respective pair of electrical contact members 32. Contact members 32 are joined by an electrically conductive retainer 34 to provide the requisite electrical connection therebetween. The pair of conductive contact members 32 are housed in openings 30A and 30B, respectively, with opening 30C being unused in the present embodiment but finding use in an alternate embodiment to be hereinafter described.

Each contact member 32 is tubular and is open at its upper end for receiving a spring 36 and plunger 38, and is closed at its lower end to provide a seat or shoulder 39 for the lower end of spring 36 and to provide the surface which is in conductive contact with a conductive pattern part 20 on the circuit board substrate 21. Each contact member 32 is part of a contact mechanism or assembly which also includes the spring 36 and the plunger 38. The contact member 32 is so sized in the radial direction as to ensure a free-sliding relation with the rotor 24. Contact spring 36 is a coil spring sized for seated insertion within the contact member 32 and adapted for compression between shoulder 39 of contact member 32 and the plunger 38. The plunger 38 may be of plastic or the like and includes a head portion 40 and a pin 42 depending from the head portion. More specifically, the plunger head portion 40 includes an uppermost portion having a diameter greater than the outside diameter of the contact member 32 and a neck portion depending therefrom of lesser diameter than the inside diameter of contact member 32. The pin 42 depends from and is of lesser diameter than the neck portion, forming a downwardly facing shoulder 43 at the transition. Pin 42 is axially, slideably inserted within the spring 36 and its position is stop-limited by engagement of the upper end of the spring with the shoulder 43.

The upper surface of heat 40 of plunger 38 preferably has a low coefficient of friction and is intended to be in substantially continuous engagement with a reaction surface which urges the plunger 38 downwardly against the bias of spring 36. Such downward force applied to the plunger 38 serves to load the spring 36 and accordingly apply a downward force to the contact member 32 to ensure good electrical contact with the contact pattern parts 20 of circuit board assembly 13. Conveniently, the reaction surface is provided by the inner or undersurface 45 of the cover 16 along the track described by plunger head 40 as rotor 24 rotates. The reaction surface 45 might alternatively be considered as a camming surface and, in the preferred embodiment, is substantially flat and is maintained at a substantially constant spacing from the contact pattern parts 20 of the circuit assembly 13. However, as illustrated by broken lines in a part of FIG. 3, the cover 16' might have a camming or reaction surface 45' which is not planar, and thereby varies the spacing with the circuit assembly 13 such that the downward force applied to the contact member 32 is accordingly varied.

With the aforementioned arrangement of a contact mechanism, a predetermined, and for that matter variable, spring force may be applied to the contact member 32 for urging it into good electrical contact with contact pattern part 20. Moreover, because the contact member 32 is free to slide within the wiper switch carriage assembly 12 and the reaction forces are applied substantially only on the fixed components such as cover 16 and the circuit assembly 13 and housing base portion 15, there is no off-center axial force applied to rotor 24 which might cause it to cock or bind.

Figure 2:
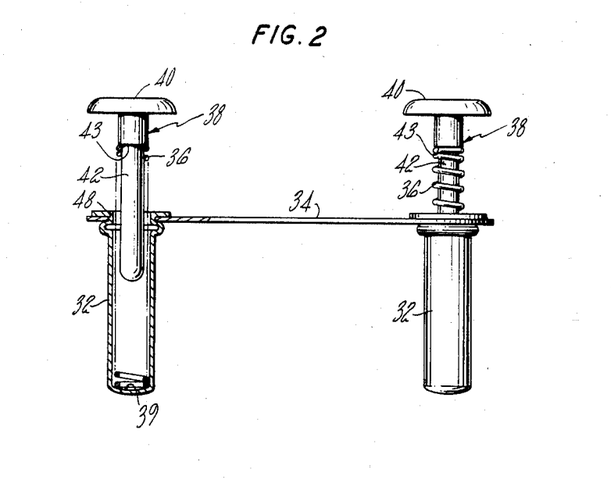
FIG. 2 is a view, partly in section, of the contact arrangement employed in the switch of FIG. 1.
Figure 3:
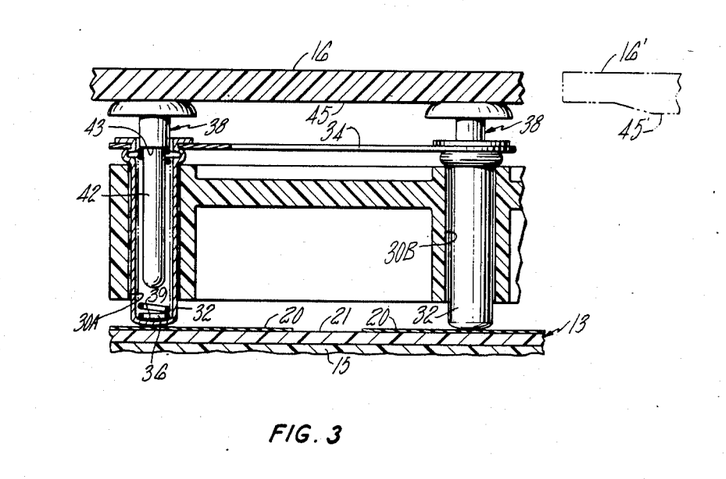
FIG. 3 is a further view of the contact arrangement of FIG. 2 operatively positioned in the switch assembly of FIG. 1.

To provide electrical connection between a pair of spaced and insulated contact pattern parts 20 on the printed circuit assembly 13, it will normally be necessary to have two contact members 32 in contact with respective contact pattern parts 20 and electrically connected by means such as retainer 34. Of course, instances may exist in which more than two contact members are joined electrically in common. It is preferable that each of the commonly-connected contact members 32 by capable of at least some degree of axial displacement relative to one another to accommodate any irregularities or camming contours in the upper or lower reaction surfaces contacted. Such independent axial flexibility minimizes the possibility of one contact member 32 becomming skewed or cocking within its respective opening in the rotor 24. To afford such independent axial motion, the conductive retainer 34 connecting a pair of contact members 32 is structured such that it is resiliently yieldable in a direction commensurate with axial motion of the contact 32 but is relatively rigid to forces acting in a direction transverse to the axial direction. Specifically, retainer 34 is a 0.010 inch thick oblong copper member having a length of approximatley one inch and a width at its narrowest of approximately 0.13 inch. A pair of circular openings 48 are formed through retainer 34 near its opposite ends. The upper ends of respective contact members 32 extend through respective openings 48 and are rigidly joined thereto as by a rivet-type of deforming of the upper end of the contact member 32 as illustrated in FIGS. 2 and 3. In those instances in which transverse or radial rigidity or stability of the relative positionings of contact members 32 is not particularly necessary, the retainer 34 might take an alternate form, as for instance, that of a conductive wire which may be bonded to the respective contact members.

One of the two openings 30D and 30E is used to slideably house a detenting element, such as detent member 52 which is biased into detenting engagement with a slotted detent contact surface 51 formed on the housing base portion 15. The detent member 52 is generally similar in structure to an electrical contact member 32, however, it typically is of a rigid nonconductive plastic material, and its lowermost end which is adapted for detenting engagement with the detent contact surface 51 may be somewhat more tapered than that of an electrical contact member 32 and its upper end is not connected with any retaining member. As in the instance of the electrical contact members 32, the detenting member 52 is urged into detenting contact with detent surface 51 by means of a coiled compression spring 56 and a force-transmitting plunger 58. The plunger 58 may be substantially identical with the plungers 38 and the interrelationship of detent member 52, spring 56 and plunger 58 is substantially identical with that of contact member 32, spring 36 and plunger 38. Depending upon the detenting forces required, the spring 56 may have a greater or lesser spring force than that of spring 36. A reaction force is delivered to plunger 58 via the undersurface 45 of housing cover 16.

A forwardly-extending appendage 59 on rotor 24 rigidly mounts a metal stem or actuator arm 60 to which a thumb button (not shown) may be affixed for applying a manual rotating force to rotor 24.

Referring again to FIG. 1, the washer switch carriage assembly 11 includes a manually actuated, linearly displaceable actuator or carriage 62 having a finger button 63 suitably affixed to a mounting flange 72 at the forward end thereof and including spaced openings 64A and 64B extending vertically therethrough for mounting respective electrical contacts 32. The washer carriage 62 is formed of rigid molded plastic and includes a longitudinally-extending guide bar 65 depending therefrom for reciprocable sliding displacement within a complementary guide slot 66 molded in housing base portion 15 toward one side thereof. The guide slot 66 extends in a fore and aft direction for reciprocation of carriage 62 in that direction. Washer carriage 62 additionally includes a guide pin 67 extending rearwardly from a rear surface thereof for sliding insertion through an opening 68 in the rear wall 69 of housing base portion 15. The opening 68 is sized and positioned to provide alignment and support for the rear end of carriage 62 at rest and during reciprocation.

A transversely extending ridge or wall 70 is formed in the housing base portion 15 at the forward end of guide slot 66 to define a stop member which limits displacement of the washer carriage 62 in each direction. Specifically, the forward end of carriage guide bar 65 contacts the rear face of stop wall 70 to define a first operating limit and the inner or rear face of mounting flange 72, which is spaced from guide bar 65, engages the forward face of stop wall 70 to define a second operating limit position. A coil spring 73 encircles the guide pin 67 intermediate the rear face of carriage 62 and is in compression for biasing carriage 62 to its outer limit position. The electrical contacts 32 associated with the washer switch carriage assembly 11 are the same as for the wiper switch assembly 12, and are connected by a retainer 34 and are urged into electrical engagement with the circuit board assembly 13 by respective springs 36 and respective plungers 38 as previously described.

The openings 64A and 64B in washer carriage 62 are positioned to the right or inwardly of the guide rail 65 so as to be in alignment with selected contact pattern parts 20 along the left side margin of the circuit board assembly 13. The patterning and positioning of the various contact pattern parts 20 associated with the contacts 32 of washer switch assembly 11 and with contacts 32 of wiper switch assembly 12 is such that retainer 34 in each instance may be of the same length to further facilitate interchangeability of parts.

A rigid appendage 74 is integrally formed with and extends transversely inward from washer carriage 62 to provide a drive member for transferring an actuating force from the washer switch assembly 11 to the wiper switch assembly 12 via a reaction member, such as torsion spring 76 affixed to rotor 24. The torsion spring 76 encircles rotor hub 26 and includes a short, radially extending tail or anchor portion 77 and a longer radially extending cantilevered arm portion 78. A spring mounting structure 80 formed on the upper surface of hub 24 includes a notch at one end which serves to anchor the tail 77 of the spring and further includes a circumferentially arcuate slot 82 extending radially therethrough for extension therethrough of the cantilevered spring arm 78. The relative configurations of the torsion spring 76 and the mounting slot 82 are such that the spring includes a slight preload which urges cantilevered arm 78 relatively counterclockwise to the limit of slot 82 as viewed from above in FIG. 1.

When washer switch assembly 11 is manually actuated rearwardly against the bias of spring 73 to its limit position, its associated drive member 74 will correspondingly be displaced along a linear path. The length and elevation of the cantilevered arm 78 of torsion spring 76 are such as to place the spring in the displacement path of the wash actuator drive member 74 for certain limited angular orientations of the wiper rotor 24. Specifically, when the rotor 24 is at a detented angular position commensurate with an "off" electrical condition for the wiper motor as depicted in FIG. 4A, the spring arm 78 will pass rearwardly of drive member 74 with some small spacing therebetween.

Figures 4A, 4B:
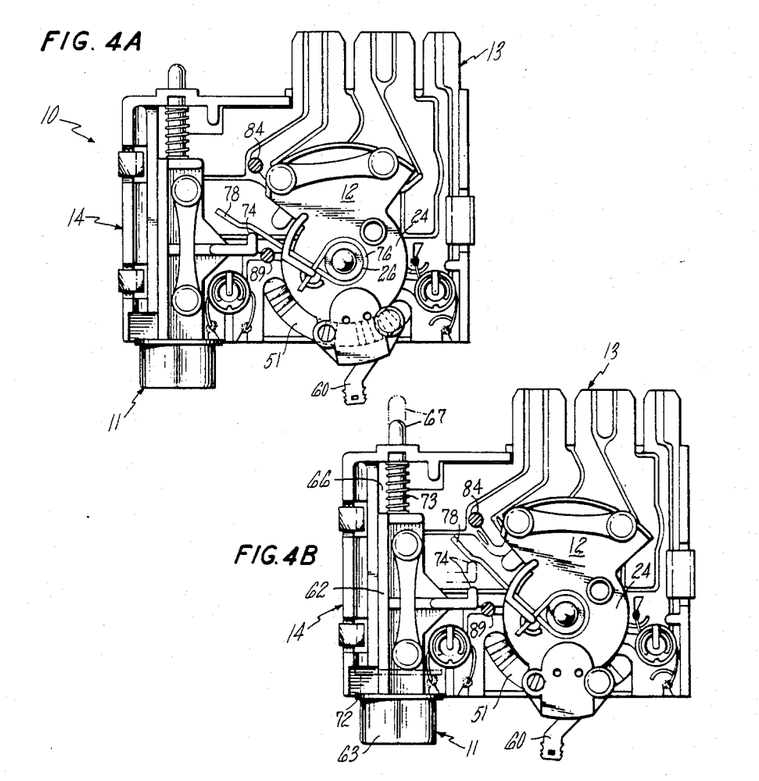

When the wash actuator carriage 62 is actuated rearwardly to its limit to energize the washer pump motor, as shown in phantom in FIG. 4B, the drive member 74 engages spring arm 78 and displaces it rearwardly also. Such rearward displacement of spring arm 78 is in a torsion-increasing direction on rotor 24 and is sufficient to overcome any detenting force of force detent member 52, thus resulting in clockwise rotation of rotor 24 to the position illustrated in FIG. 4B. The precise rotor orientation illustrated in FIG. 4B is determined principally by the angular positioning of one of the detent notches appearing on the detent contact surface 51 of the housing base portion 15. The displacement range of drive member 74 on washer actuator carriage 62 is such that, via torsion spring 76 it rotates rotor 24 just to the detented position illustrated in FIG. 4B and not beyond. In such position, electrical connection is made with the "low" speed winding of the wiper motor and is accordingly designated the "low" speed position.

Figure 4C:
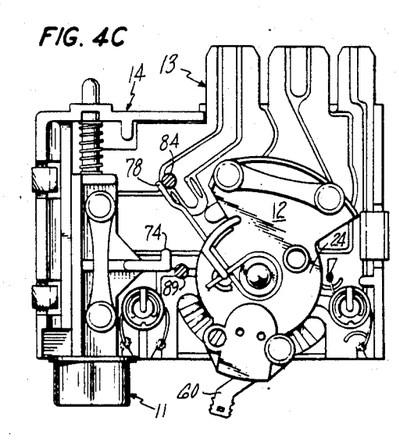
FIG. 4C illustrates the wiper switch in its "high" speed position.

Referring to FIG. 4C, the wash actuator switch 11 is shown as having been released and returned to its "off" position and the wiper rotor 24 has been manually rotated clockwise, via stem 60, to the angular position which effects "high" speed operation of the wiper motor. The precise angular location of the "high" speed position of rotor 24 is determined by limiting engagement of spring arm 78 with a stop rod 84 molded with and depending from the underside of cover 16 and additionally by detenting engagement of detent member 52 with an appropriately-positioned notch in the detenting contact surface 51.

Figure 4D:
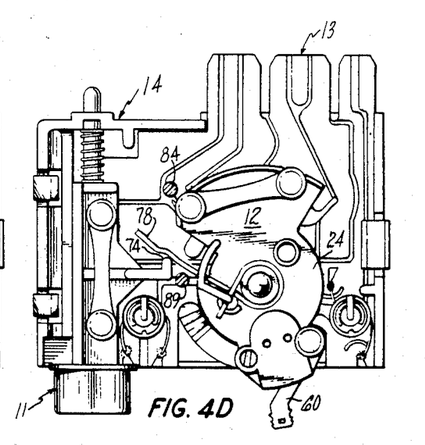
FIG. 4D illustrates the washer switch actuated to its "mist" position.

The wiper rotor 24 may also be manually rotated counterclockwise, via the stem 60, from any one of the aforementioned positions to a counterclockwise extreme represented in FIG. 4D and being designated as a "mist" position. The "mist" position is electrically the same as the "low" speed position of wiper operation and is intended for several sweeps of a wiper so long as the operator maintains the wiper switch assembly rotated to the "mist" position. Specifically, when rotor 24 is rotated counterclockwise from the "off" position (FIG. 4A), the spring arm 78 immediately engages the drive member 74 of wash carriage 62. However, because the wash carriage is at its "off" limit position, the drive member 74 now effectively serves also as a stop member to prevent further angular displacement of spring arm 78 relative to that member and to the housing 14 as a whole. On the other hand, because the spring mount 80 includes arcuate slot 82, some limited resilient angular displacement of spring arm 78 is permitted relative to rotor 24, or in other words, the rotor is permitted to rotate counterclockwise to a limited extent against the return bias force now provided by spring 78. Such counterclockwise displacement of rotor 24 from its "off" position is typically only a few degrees but is effective to provide the requisite electrical contact for "low" speed operation of the wiper motor. When the actuating stem 60 of rotor 24 is released, the rotor instantly returns to its "off" position represented in FIG. 4A.

Referring briefly to the circuit board assembly 13 as illustrated in FIG. 1, a plastic arc suppression pad 86 is affixed to the upper surface of one of the conductive pattern parts 20, as by heat staking to the substrate 21. The arc suppression pad 86 comprises three fingers oriented radially to the axis of rotation of rotor 24 to divide the particular contact pattern part 20 into three electrically identical, but physically separate regions along the path of electrical contact member 32 disposed in opening 30B of the rotor. The pad 86 is of sufficient thickness to cause the contact member 32 to raise away from the contact surface 20 as it crosses a respective finger. Such abrupt separation of a contact member 32 from a contact surface 20 aids in suppressing any electrical arc and further serves to concentrate any arcing on that pattern part. In this latter regard, it will be noted that the relevant pattern part 20 is of relatively large area and better suited for heat absorption than one or more smaller pattern parts 20 which may underlie the other contact member 32 housed in opening 30A.

Figure 5:
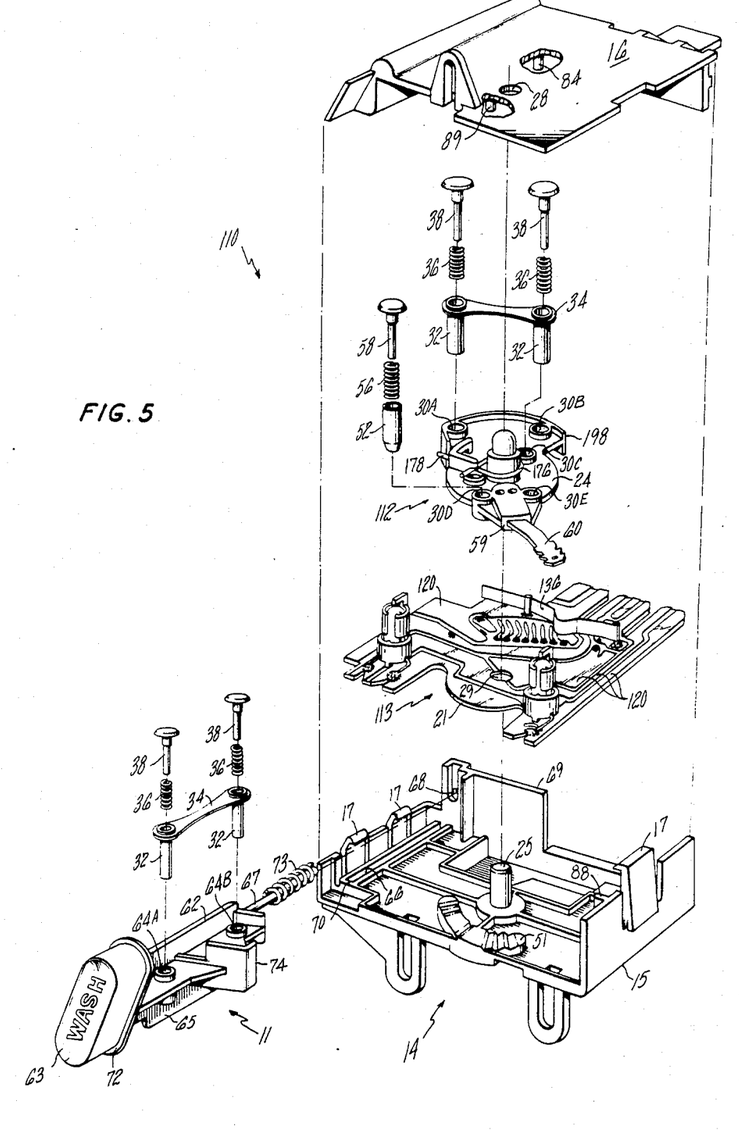
FIG. 5 is an exploded view of another washer/wiper switch including provision for intermittent, or delay, operation.

Referring now to FIG. 5 there is illustrated an exploded view of another embodiment of a washer/wiper switch assembly 110. Washer/wiper switch assembly 110 is identical in many respects to the washer/wiper switch assembly 10 of FIG. 1, and the parts identical in both will be similarly numbered and no further description given. Those aspects of switch assembly 110 which differ will accordingly receive different numerals and will be hereinafter described. Switch assembly 110 affords so-called "delay" or "intermittent" operation of a wiper whereby the delay or interval between successive sweeps of a wiper motor (not shown) may be incrementally varied. The circuitry (not shown) for effecting intermittent operation of the wiper motor is of a known type generally positioned directly at the wiper motor and capable of providing motor-operating pulses at intervals determined by a variable RC time constant. The variability of the RC time constant is provided by a variable resistance, the value of which is determined by the angular positioning of a wiper switch carriage assembly 112 relative to a circuit board assembly 113.

Carriage switch assembly 112 is in most respects identical to the carriage switch assembly 12 of FIG. 1 with the following exceptions. Firstly, the pair of contact members 32 are disposed in openings 30A and 30C of rotor 24. The detent member 52 is positioned in opening 30D of rotor 24. The actuator arm 60 extends from appendage 59 of rotor 24 at a rightward angle rather than a leftward angle. This is conveniently attained by forming the actuator 60 with a dog leg and simply inverting the actuator in the two different embodiments of FIGS. 1 and 5. Further, the torsion spring 176 differs in that its cantilevered arm 178 is shorter than arm 78 of spring 76 in the FIG. 1 embodiment for a reason to be hereinafter described.

The circuit board assembly 113 differs from the assembly 13 in the FIG. 1 embodiment in the following respects. The arc suppression pad 86 of the FIG. 1 embodiment has been omitted. The several individual conductive contact pattern parts 120 disposed on substrate 21 are arranged in different patterns than that of the FIG. 1 embodiment. Most significant in this regard is the generally arcuate array of generally radially-extending contact pattern fingers 120'. The array of contact pattern fingers 120' is arranged to underlie the arcuate path described by the contact member 32 disposed in opening 30A of rotor 24. In that arcuate path of contact with the contact member 32, each of the contact fingers 120' is relatively closely spaced to the next in the array to minimize the space occupied by the collective contact fingers in the array. In the illustrated embodiment, there are seven contact fingers 120' and a larger contact pattern part 120 having a finger-like projection forming the rightmost extreme of the array.

Figure 6:
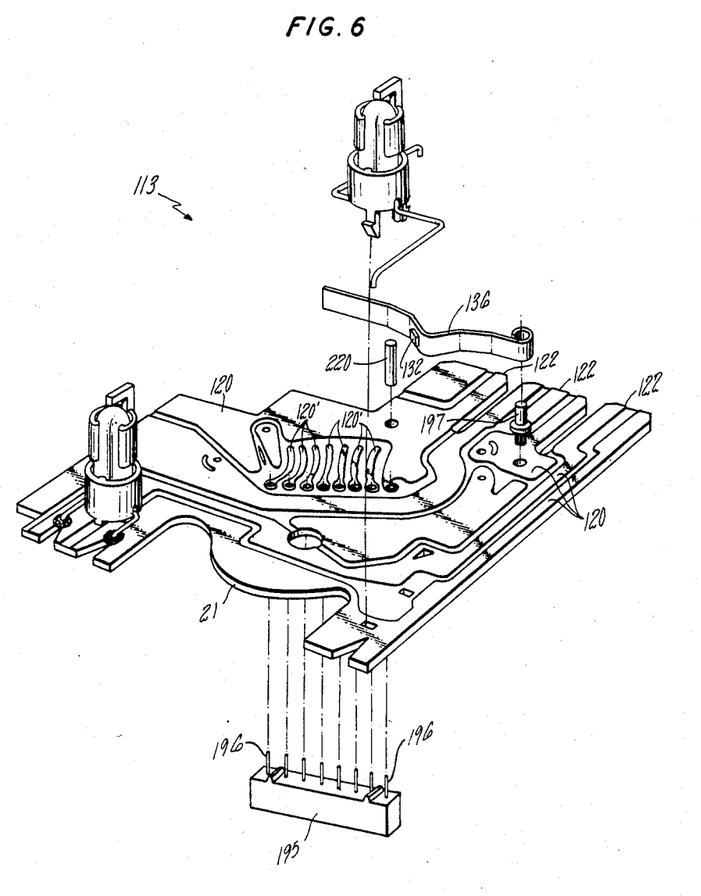
FIG. 6 is an exploded view of the circuit board utilized in the switch of FIG. 5.

An accurately-trimmed resistive element, such as a thick film resistor network 195 has multiple leads 196 which each represent a different resistive tap to the resistor network 195. The resistor network 195 may be conveniently manufactured and trimmed as a discrete element separate from the circuit board of assembly 113. In the embodiment of FIGS. 5 and 6, resistor network 195 is provided with eight leads 196, each lead providing a separate resistive tap and being electrically connected with a respective one of the contact fingers 120' (or 120) forming the aforementioned array. The housing base portion 15 is conveniently provided with recesses such that resistor network 195 may be disposed on the underside of circuit board substrate 21 and the leads 196 feed through the board for connection at its upper surface to the conductive pattern parts 120' and 120. Although the arcuate or circumferential width of the contact fingers 120' in the array is relatively narrow and the spacing therebetween is also narrow in that arcuate region described by the path of the contact 32 in rotor opening 30A, such spacing constraint may be more relaxed in other regions of the circuit board assembly 113 at which the contact members 32 do not make contact. Accordingly, it will be noted that the radially innermost ends of the array of contact fingers 120' are somewhat more widely spaced to accommodate the normally-wider spacing of the leads 196 from resistor network 195.

A further distinction existing on circuit board assembly 113 of the FIGS. 5 and 6 embodiment relative to that of the FIG. 1 embodiment is provided by a further contact 132 which is conductively affixed to and carried by an electrically conductive beam spring 136 having a fixed end electrically connected to one of the contact pattern parts 120, as via a conductive pin 197 mounted in substrate 21. A conductive contact pin 220 is mounted in the substrate 21 in electrical connection with another one of the contact pattern parts 120 and is positioned for selective switching contact with contact 132. Both conductive pins 197 and 220 are connected to the respective contact pattern parts relatively near the connection terminal tabs 122 of assembly 113 to minimize the resistance of the conductive path therebetween. By minimizing the resistance, any voltage drop and resulting heat are also minimized.

The beam spring 136 is formed and oriented such that a cam-following portion thereof is biased radially-inward into engagement with a radially-outward facing camming surface 198 of rotor 24. Camming surface 198 of rotor 24 is seen most clearly in FIGS. 7A-E and is provided by an arcuate section of the outer circumference of the rotor. The radius of camming surface 198 serves to displace beam spring 136 radially outward sufficiently to disengage contact 132 from contact pin 220 until the rotor is rotated sufficiently rightward or clockwise for beam spring 136 to move inward into a radially-inward extending discontinuity in the camming surface which thereby allows engagement of contact members 132 and 220.

Figure 7A:
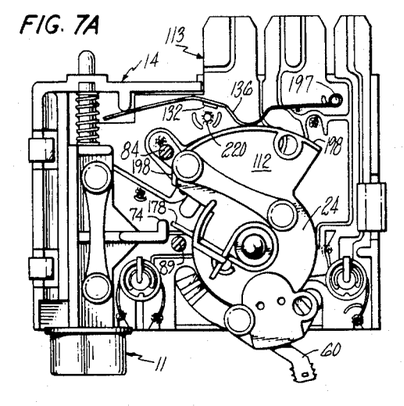

Referring to FIG. 7A, the washer/wiper switch assembly 110 is depicted in the configuration providing an "off" electrical condition for both the wash pump motor and the wiper motor, and is generally analogous to FIG. 4A.

Figure 7B:
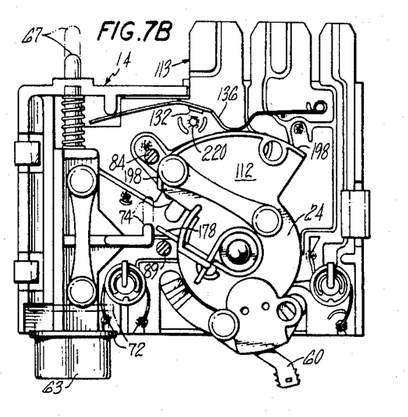
FIG. 7B illustrates, in phantom, the washer switch actuated without also actuating the wiper switch.

FIG. 7B illustrates in phantom the washer switch assembly 11 actuated rearwardly to its limit to energize the pump motor. However, unlike the somewhat analogous situation of FIG. 4B, the wiper carriage assembly 112 is not thereby actuated. Specifically, because the cantilevered arm 178 of torsion spring 176 on rotor 24 has been shortened, it no longer extends into the path of drive member 74 on the wash actuator carriage 62. Thus, the wash motor may be energized without automatically also energizing the wiper motor. It will be appreciated that such difference between the FIG. 1 and FIG. 5 embodiment constitutes a design option.

Figure 7C:
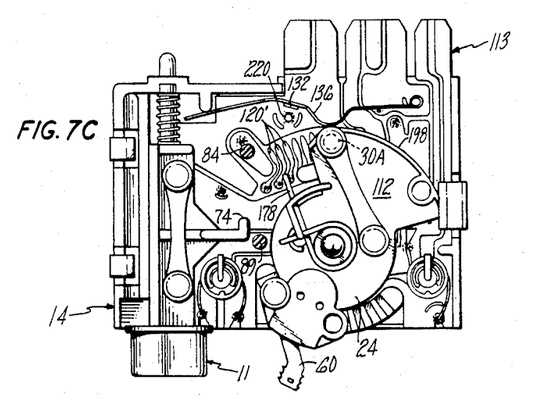
FIG. 7C illustrates the wiper switch positioned in a range of delay operating positions.

Referring to FIG. 7C, the rotor 24 is illustrated as having been manually rotated clockwise through a small angle from the "off" position to a position which places it over one of the several contact fingers 120' in the array of delay contacts. The several contact fingers 120' in the array are connected to the leads 196 of resistor 195 in a sequence which provides maximum delay between wiper sweeps at the closest position to the "off" position and minimum delay as rotor 24 is rotated further clockwise to the limit of the array of contacts 120'. The next small incremental clockwise rotation of rotor 24 achieves the position which provides "low" speed operation of the wiper motor. Detenting of the rotor 24 at this "low" speed position is provided by an appropriate detent notch in the contact surface 51 of the housing for engagement by the detent member 52 carried by the rotor in opening 30D.

Figure 7D:
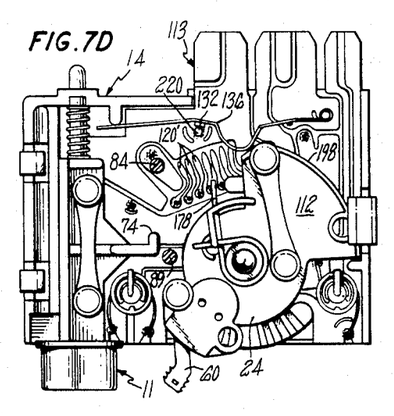
FIG. 7D illustrates the wiper switch in its "high" speed position.

FIG. 7D illustrates the rotor 24 having been rotated further clockwise to a limit position in which the discontinuity in the rotor camming surface 198 has allowed beam spring 136 to flex radially inwardly and bring contacts 132 and 220 into engagement. Such position electrically corresponds with the "high" speed operation of the wiper motor. Moreover, rotor 24 will be yieldingly held in this position by the detenting effect of the cam follower portion of the beam spring 136 acting on the rotor to resist counterclockwise motion. A small stop 88 formed in the base housing 15 also limits further clockwise rotation of rotor 24.

Figure 7E:
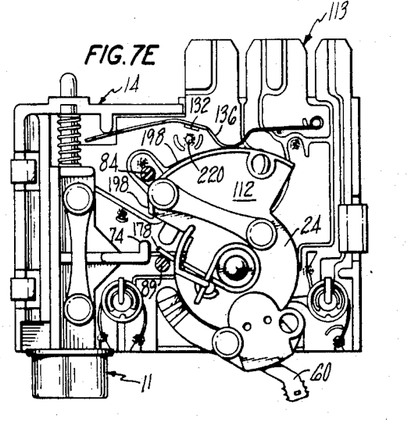
FIG. 7E illustrates the wiper switch actuated to its "mist" position.

Referring to FIG. 7E, the rotor 24 is shown displaced counterclockwise from its "off" position to provide the "mist" operation referred to above in conjunction with the description of FIG. 4D. As was discussed therein, this position effects temporary "low" speed operation of the wiper motor and is discontinued when the actuator arm 60 is released. Like the FIG. 4D embodiment, the bias for returning the rotor to the "off" position is provided by flexure of the cantilevered arm 178 of torsion spring 176. However, the FIG. 5 embodiment does differ from the FIG. 1 embodiment in that because the length of cantilevered spring arm 178 has been shortened, it can no longer utilize the drive member 74 of washer switch 11 as a stop member. Accordingly, a stop rod 89 depends, like stop rod 84, from the undersurface of cover portion 16 and is positioned to engage and limit counterclockwise displacement of the shortened spring arm 178 to provide the requisite return bias to the rotor 24.

Although this invention has been shown and described with respect to detailed embodiments thereof, it will be understood by those skilled in the art that various changes in form and detail thereof may be made without departing from the spirit and scope of the claimed invention.

Having thus described a typical embodiment of our invention, that which is claimed as new and desired to secure by Letters Patent of the United States is:

1. A switch for controlling wiper delay including:
 a housing;
 a circuit board positioned in the housing and having a contact pattern of several parts disposed on a surface thereof, some of said contact pattern parts being arranged in an array;
 a carriage movable in the housing;
 electrical contact means mounted on said carriage and disposed for engagement with selected parts of said contact pattern as a function of the position of said carriage;
 a discrete resistive element having at least three conductive leads extending therefrom and subdividing said resistive element into a resistor network having a plurality of resistive values, each said conductive lead of said resistive element being electrically conductively affixed to a respective one of said contact pattern parts in said array; and
 said carriage being manually actuatable to said contact means into contact with successive ones of said contact pattern parts in said array to vary the interval between sweeps of a wiper.

2. The switch of claim 1 wherein said carriage is mounted for rotation about an axis and said contact pattern parts in said array are sequentially spaced along an arcuate path defined by said contact means during rotation of said carriage.

3. The switch of claim 2 wherein said contact pattern parts in said array are narrow, closely-spaced and generally radially-extending.

4. The switch of claim 3 wherein said conductive leads from said resistive element number at least five.

5. The switch of claim 4 wherein said resistive element is positioned on the reverse surface of said circuit board from said surface on which said array of contact pattern parts exists.

6. The switch of claim 5 wherein said resistive element is of the deposited film type.

7. The switch of claim 2 wherein said carriage includes a cam surface on a peripheral surface thereof, and including another electrical contact means, said other contact means being resiliently supported by a conductive beam spring having one end mounted in fixed conductive engagement with one of said contact pattern parts, said beam spring being in biased engagement with said carriage cam surface for selective electrical connection of said other contact means with another of said contact pattern parts as a function of the carriage position.

8. The switch of claim 7 wherein said other contact means controls the application of current for high-speed operation of a wiper motor, said one and said other of said contact pattern parts have connection terminals at an edge of said circuit board, a conductive path being formed between said other contact means and said connection terminals via said one and said other of said contact pattern parts, and said electrical connection of said other contact means with said one and said other of said contact pattern parts is near said connection terminals to minimize the resistance of the conductive path.

9. The switch of claim 2 wherein said carriage is rotatable in first and second opposite directions from a first position, said first position being representative of an "off" condition for a wiper motor, said first direction of rotation being effective to place said contact means in engagement with successive ones of said contact pattern parts in said array and said second direction of rotation being effective at a second position of said carriage to place said contact means in engagement with one of said contact pattern parts for effecting one-speed operation of said wiper, and including torsion spring means affixed to said carriage, said spring means including a cantilevered arm extending radially from said carriage, and stop means mounted within said housing to intercept said spring means arm at said carriage first position only when said carriage is rotated in said second direction, thereby to resiliently bias said carriage toward said first position from said second position.

10. The switch of claim 9, said switch being adapted to also control energization of a washer motor and including within said housing, a second carriage mounted for manually actuated linear displacement from a first position to a second position, said second carriage being biased to said first position, and other contact means mounted on and moving with said second carriage for engagement with certain ones of said contact pattern parts, said other contact means and said certain ones of said contact pattern parts being operative in said first position of said second carriage to deenergize said washer motor and in said second position to energize said washer motor.

* * * * *

UNITED STATES PATENT AND TRADEMARK OFFICE
CERTIFICATE OF CORRECTION

PATENT NO. : 4,613,733

DATED : September 23, 1986

INVENTOR(S) : ROBERT S. MIGRIN and DAVID V. TINDER

It is certified that error appears in the above-identified patent and that said Letters Patent is hereby corrected as shown below:

Column 12, line 4 (claim 1): After the word "to" insert --place--.

Signed and Sealed this

Second Day of December, 1986

Attest:

DONALD J. QUIGG

Attesting Officer

Commissioner of Patents and Trademarks